United States Patent
Yuan et al.

(10) Patent No.: US 10,443,218 B2
(45) Date of Patent: Oct. 15, 2019

(54) FAUCETS PROVIDING MIXED WATER AND AIR FLOW

(71) Applicant: GLOBE UNION INDUSTRIAL CORP., Taichung (TW)

(72) Inventors: Chiahua Yuan, Taichung (TW); Yiping Lin, Taichung (TW); Huiling Chiu, Taichung (TW); Yuanhao Chang, Taichung (TW)

(73) Assignee: GLOBE UNION INDUSTRIAL CORP., Taichuang (TW)

(*) Notice: Subject to any disclaimer, the term of this patent is extended or adjusted under 35 U.S.C. 154(b) by 0 days.

(21) Appl. No.: 15/866,397

(22) Filed: Jan. 9, 2018

(65) Prior Publication Data
US 2018/0127959 A1  May 10, 2018

Related U.S. Application Data

(63) Continuation-in-part of application No. 15/189,087, filed on Jun. 22, 2016, now Pat. No. 10,106,965.

(30) Foreign Application Priority Data

Aug. 25, 2015 (TW) .............................. 104127758 A

(51) Int. Cl.
*E03C 1/084* (2006.01)
*B05B 1/02* (2006.01)
(Continued)

(52) U.S. Cl.
CPC ................ *E03C 1/084* (2013.01); *B05B 1/02* (2013.01); *B05B 1/1618* (2013.01);
(Continued)

(58) Field of Classification Search
CPC .................. E03C 1/0404; E03C 1/084; E03C 2001/0415; E03C 2001/0417;
(Continued)

(56) References Cited

U.S. PATENT DOCUMENTS 3,144,878 A   8/1964  Williams
3,580,503 A   5/1971  Ligon et al.
(Continued)

FOREIGN PATENT DOCUMENTS

CN   205331574 U   6/2016
CN   205479654 U   8/2016
(Continued)

OTHER PUBLICATIONS

Extended European Search Report pursuant to Rule 62 EPC, the European Search Report (R. 61 EPC) or the partial European Search Report/Declaration of no search (R. 63 EPC) and the European Search Opinion issued in corresponding Foreign Application No. 16184186.1-1608 (9 pgs.).

*Primary Examiner* — Marina A Tietjen
*Assistant Examiner* — Frederick D Soski
(74) *Attorney, Agent, or Firm* — Finnegan, Henderson, Farabow, Garrett & Dunner LLP

(57) ABSTRACT

A faucet having a faucet base, a water hose, a faucet head, and a chamber is provided. A water valve is provided in the chamber and includes a driving member and a control valve movable between a first position enabling mixing of water and air and a second position enabling shut-off of a water flow. The faucet head further includes a sliding member slidably coupled with the faucet head to enable a user to operate the control valve within the water valve by operating the sliding member from a side of the faucet head.

19 Claims, 11 Drawing Sheets

(51) Int. Cl.
*E03C 1/04* (2006.01)
*B05B 1/16* (2006.01)
*B05B 7/04* (2006.01)
*E03C 1/02* (2006.01)
*B05B 1/18* (2006.01)

(52) U.S. Cl.
CPC .......... B05B 7/0425 (2013.01); E03C 1/0404 (2013.01); *B05B 1/18* (2013.01); *E03C 2001/026* (2013.01); *E03C 2001/0415* (2013.01); *Y02A 20/202* (2018.01); *Y02A 20/411* (2018.01); *Y10T 137/9464* (2015.04)

(58) Field of Classification Search
CPC ............. E03C 1/0405; E03C 2001/026; Y10T 137/9464; F16K 31/5284; B04B 12/002; B04B 1/02; B05B 1/02; B05B 1/1618; B05B 7/0425; B05B 1/18
USPC .................................................. 251/65, 340
See application file for complete search history.

(56) References Cited

U.S. PATENT DOCUMENTS

| | | | | |
|---|---|---|---|---|
| 4,495,965 | A * | 1/1985 | Ise | F15B 13/02 137/601.19 |
| 4,522,592 | A * | 6/1985 | Johnson | A61C 17/043 251/340 |
| 5,100,055 | A * | 3/1992 | Rokitenetz | B05B 1/1654 239/11 |
| 5,312,049 | A * | 5/1994 | Bayler | B05B 1/32 239/578 |
| 6,131,608 | A | 10/2000 | Lu | |
| 8,424,781 | B2 * | 4/2013 | Rosko | B05B 1/1609 239/446 |
| 8,757,518 | B2 * | 6/2014 | Kao | E03C 1/0412 137/801 |
| 9,175,459 | B2 | 11/2015 | Zhang et al. | |
| 9,707,572 | B2 | 7/2017 | Erickson et al. | |
| 9,708,800 | B2 * | 7/2017 | Bosio | E03C 1/0404 |
| 2002/0185553 | A1 | 12/2002 | Benstead et al. | |
| 2004/0112985 | A1 * | 6/2004 | Malek | B05B 1/1618 239/445 |
| 2005/0001064 | A1 | 1/2005 | Taketomi et al. | |
| 2007/0069169 | A1 | 3/2007 | Lin | |
| 2008/0276367 | A1 * | 11/2008 | Bares | E03C 1/04 4/677 |
| 2008/0302886 | A1 * | 12/2008 | Hodel | B05B 1/1618 239/443 |
| 2009/0032610 | A1 * | 2/2009 | Rosko | B05B 1/1627 239/11 |
| 2009/0045370 | A1 * | 2/2009 | Kao | E03C 1/08 251/324 |
| 2011/0049273 | A1 | 3/2011 | Huang | |
| 2014/0026980 | A1 | 1/2014 | Esche et al. | |
| 2014/0069520 | A1 | 3/2014 | Esche et al. | |
| 2016/0222635 | A1 | 8/2016 | Yuan et al. | |
| 2017/0058496 | A1 | 3/2017 | Chiu et al. | |
| 2017/0059050 | A1 | 3/2017 | Chiu et al. | |
| 2017/0059051 | A1 | 3/2017 | Chiu et al. | |

FOREIGN PATENT DOCUMENTS

| | | |
|---|---|---|
| CN | 205745594 U | 11/2016 |
| CN | 206054896 U | 3/2017 |
| CN | 104879556 B | 6/2017 |
| CN | 206320347 U | 7/2017 |
| CN | 206338480 U | 7/2017 |
| DE | 10 2016 115 796 A1 | 3/2017 |
| EP | 3 135 832 A1 | 8/2016 |
| TW | M432670 | 7/2012 |
| TW | 1567272 B | 1/2017 |
| WO | WO 2008/137034 A1 | 11/2008 |

* cited by examiner

FAUCETS PROVIDING MIXED WATER AND AIR FLOW

CROSS-REFERENCE TO RELATED APPLICATION

This application is a Continuation-in-Part Application of application Ser. No 15/189,087, which was filed Jun. 22, 2016.

TECHNICAL FIELD

The present invention relates to faucets providing mixed water and air flow, including faucets having a faucet head with a sliding member to control a water valve enabling the mixing of water and air.

BACKGROUND

Control valves for faucets have various components, many of which are discrete parts that are assembled to ensure good water-tight seal and long-term durability or reliability. The manufacturing of faucets, however, can become complicated and expensive as the features, controls, and/or functions of faucets are revised over time.

For certain water faucet applications, one-touch valves were developed so a tap on an actuation element can control the water flow. An example of one-touch valves is those supplied by the 3M Company for mounting externally to a faucet. A one-touch valve may simplify the operation of a faucet. However, these one-touch valves are add-on components for placements at where water is discharged, i.e., directly at the outlet of a faucet. This also means that the valves are operated directly at the outlet where water flows through.

But adding a one-touch valve changes the overall design, dimension, and aesthetic appearance of a faucet, limiting the flexibility and/or attractiveness of the design or application. A post-sale-modification may raise reliability, durability, or repair issues. Further, operating a faucet outlet with hands, arms, or other parts of one's body, which may have grease, bacteria, or other contaminants may add grease, bacteria, or other contaminants to the faucet outlet itself, leading to hygiene or other concerns.

Conventional faucets contain handles to control water flow. When the faucet is operated in circumstances that require frequent on/off operations, having handles that are away from the location where water is discharged may cause inconvenience. Although placing a handle near the location where water is discharged may be a solution, it may limit design options. For example, if a faucet has a removable head that travels with a connecting hose, the location of the control may affect the faucet hose or faucet design or limit its portability. As another example, closing the distance between the location where water is discharged and the control handle may limit design aesthetics.

SUMMARY

According to a disclosed embodiment, there is provided a faucet. The faucet can include a faucet base, a water hose, a faucet head, a chamber, a water valve, and a sliding member.

The faucet base can include a first and second end. The faucet base can be adapted to be mounted to support the faucet near the first end and to regulate water flow through the faucet.

The water hose can be coupled with the faucet base by extending through the first end and second end of the faucet base. The water hose can be adapted to be flexible and movable through an opening in the first end and through an opening in the second end.

The faucet head can be movably coupled to the second end of the faucet base. The faucet head can be adapted to be dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base.

The chamber can be provided within the faucet head and have a first end and a second end. The first end of the chamber can be coupled with the water hose and can be coupled, in a dismountable manner, to the second end of the faucet base. The second end of the chamber can provide an outlet to discharge the mixture of water-and-air flow.

The water valve can be provided within the chamber and can be located between the first end and the second end of the chamber. The water valve can include at least one air inlet and a water inlet to enable mixing air from the at least one air inlet with water from the water inlet. The water inlet can be coupled with the water hose. The air inlet can be coupled with the chamber.

The water valve can further include a control valve movable within the water valve between a first position and a second position. The first position can enable mixing air from the air inlet with water from the water inlet to provide the mixture of water-and-air flow. The second position can enable shut-off of the mixture of water-and-air flow. A direction of the control valve's movement between the first position and the second position can be substantially parallel to a direction of a water flow from the first end of the chamber to the second end of the chamber. The control valve can use a water pressure supplied by the water hose to facilitate an operation of the control valve.

The sliding member can be movably coupled with the faucet head at a side of the faucet head. The sliding member can be adapted to enable the operation of the control valve within the water valve by being slid from a side of the faucet head in a direction substantially parallel to the direction of the water flow from the first end of the chamber to the second end of the chamber. The sliding of the sliding member can cause the control valve to move between the first position and the second position.

According to another disclosed embodiment, there is provided a faucet. The faucet can include a faucet base, a water hose, a faucet head, a water valve, and a sliding member.

The faucet base can have a first and second end.

The water hose can extend within the faucet base and can be movable through the second end of the faucet base.

The faucet head can have a first end, a second end, a chamber between the first and second end of the faucet head and coupled with the water hose, and an outlet coupled with the chamber at or near the second end of the faucet head to discharge a mixture of water-and-air flow. The first end of the faucet head can be adapted to be coupled to the second end of the faucet base while remaining coupled to the water hose and to be dismountable from the second end of the faucet base while remaining coupled to the water hose.

The water valve can be provided within the chamber. The water valve can include one or more air inlets and a water inlet to enable mixing air from the one or more air inlets with water from the water inlet. The water inlet can be coupled with the water hose. The one or more air inlets can be coupled with the chamber.

The water valve can further include a control valve movable within the water valve between a first position and a second position. The first position can enable mixing air from the air inlet with water from the water inlet to provide the mixture of water-and-air flow. The second position can enable shut-off of the mixture of water-and-air flow. The control valve can be adapted to move between the first position and the second position in a direction substantially parallel to a direction of a water flow from the first end of the faucet head to the second end of the faucet head. The control valve can use a water pressure supplied by the water hose to facilitate an operation of the control valve.

The sliding member can be movably coupled with the faucet head at a side of the faucet head. The sliding member can be adapted for user operation by sliding in a direction substantially parallel to the direction of the water flow from the first end of the chamber to the second end of the chamber to cause the control valve to move between the first position and the second position.

According to yet another disclosed embodiment, there is provided a faucet. The faucet can include a faucet base, a water hose, a faucet head, a chamber, a water valve, and a sliding member.

The faucet base can have a first end, second end, and a water flow control coupled near the first end for regulating a water flow through the faucet. The first end of the faucet base can be adapted to be mounted to support the faucet.

The water hose can be accommodated between the first end and second end of the faucet base and can be movable through an opening near the first end and an opening near the second end of the faucet base.

The faucet head can be coupled to the water hose and, in a dismountable manner, to the second end of the faucet base while remaining coupled to the water hose.

The chamber can be provided within the faucet head. The chamber can have a first and second end. The first end of the chamber can be coupled with the water hose and can be coupled, in a dismountable manner, to the second end of the faucet base. The chamber can be adapted to discharge a mixture of water-and-air flow near the second end of the chamber.

The water valve can be provided within the chamber and can be located between the first and second end of the chamber. The water valve can include an air inlet and a water inlet to enable mixing air from the air inlet with water from the water inlet to provide the mixture of water-and-air flow. The water inlet can be coupled with the water hose. The air inlet can be coupled with the chamber.

The water valve can further include a control valve movable within the water valve between a first position and a second position in a direction approximately parallel with a direction of a water flow from the first end of the chamber to the second end of the chamber. The first position can enable mixing air from the air inlet with water from the water inlet to provide the mixture of water-and-air flow. The second position can enable shut-off of the mixture of water-and-air flow. An operation of the control valve can be facilitated by a water pressure supplied by the water hose.

The sliding member can be movably coupled with the faucet head. The sliding member can include a first surface being adapted for user operation in a direction approximately parallel to a side surface of the faucet head. The sliding member can further include a second surface mechanically coupled with the first surface. The second surface can be adapted to engage with the control valve in a way to move the control valve from the second position to the first position when the first surface is operated by sliding.

DETAILED DESCRIPTION

Figure 1:
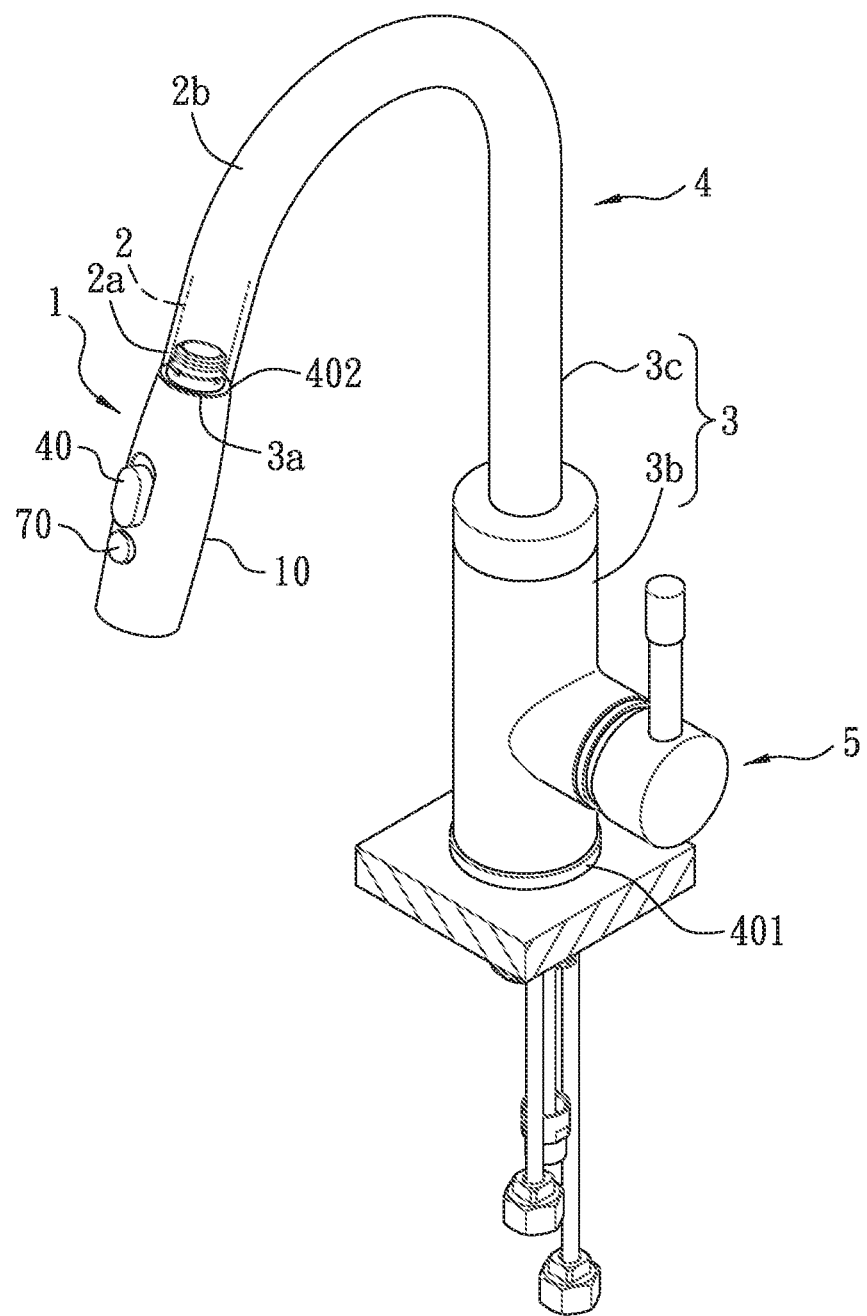
FIG. 1 is a perspective view illustrating an embodiment of a faucet consistent with the present invention.

Referring to FIG. 1, one embodiment of the present invention provides a faucet including a faucet base 4, a water hose 2, and a faucet head 1. Faucet base 4 can include a first end 401 and a second end 402. Water hose 2 can be coupled to faucet base 4 by extending through first end 401 and second end 402 of faucet base 4. Water hose 2 can be adapted to be flexible and movable through an opening of first end 401 and through an opening of second end 402 of faucet base 4. Faucet head 1 can be movably coupled to second end 402 of faucet base 4. Faucet head 1 can be adapted to be dismountable, and can be pulled away, for example, from faucet base 4 while remaining coupled to water hose 2 to direct water to a location away from faucet base 4. Faucet head 1 can be adapted to be relocated back to faucet base 4.

Faucet base 4 can be mounted to support the faucet near first end 401 and to regulate water flow through the faucet. Faucet base 4 can include a water flow control 5 coupled with water hose 2 and located near first end 401 of faucet base 4 to control an amount of water flowing through water hose 2 and to vary a mix of cold water and hot water going into water hose 2. For example, water flow control 5 can be mounted near a lower portion of faucet base 4 near a side opening of faucet base 4. Water flow control 5 can be coupled with water hose 2, a cold water intake, and a hot water intake to vary, when a water flow is enabled, a mix of cold water and hot water going into water hose 2.

Figure 2:
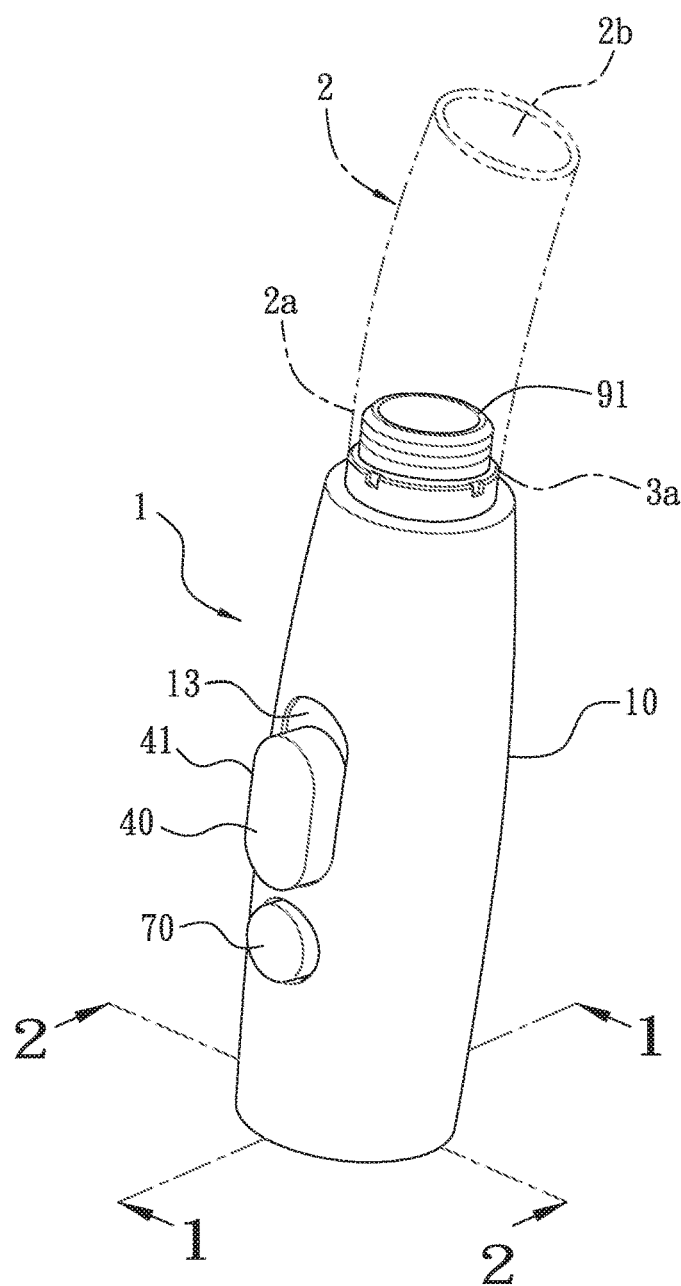
FIG. 2 is a perspective view illustrating an embodiment of a faucet head consistent with the present invention, with dotted line illustrating a water hose.

Referring to FIGS. 1 and 2, a faucet head 1 can be mounted on a pull-out faucet base 4 or a pull-down faucet base 4, which can include a body portion 3 and, for example, can be mounted in a kitchen or a bathroom, such as over or near a sink. Faucet head 1 can be coupled with a water supply segment 2a of water hose 2, and water hose 2 can be movably accommodated within and slidable through faucet base 4. Water hose 2 can include a water conduit 2b defined therein. Faucet head 1 and water hose 2 can be pulled out and retracted back to an outlet 3a at second end 402 of faucet base 4. Body portion 3 of faucet base 4 can include a base holder 3b and a tubular extension 3c extending from holder 3b and, in some embodiments, bend forward and downward as illustrated in FIG. 1. The amount of the bend, illustrated like a swan neck in FIG. 1, may depend on aesthetic designs, faucet applications, cost/manufacturing considerations, and/or other factors. Water hose 2 can extend through holder 3b and tubular extension 3c.

Figure 3:
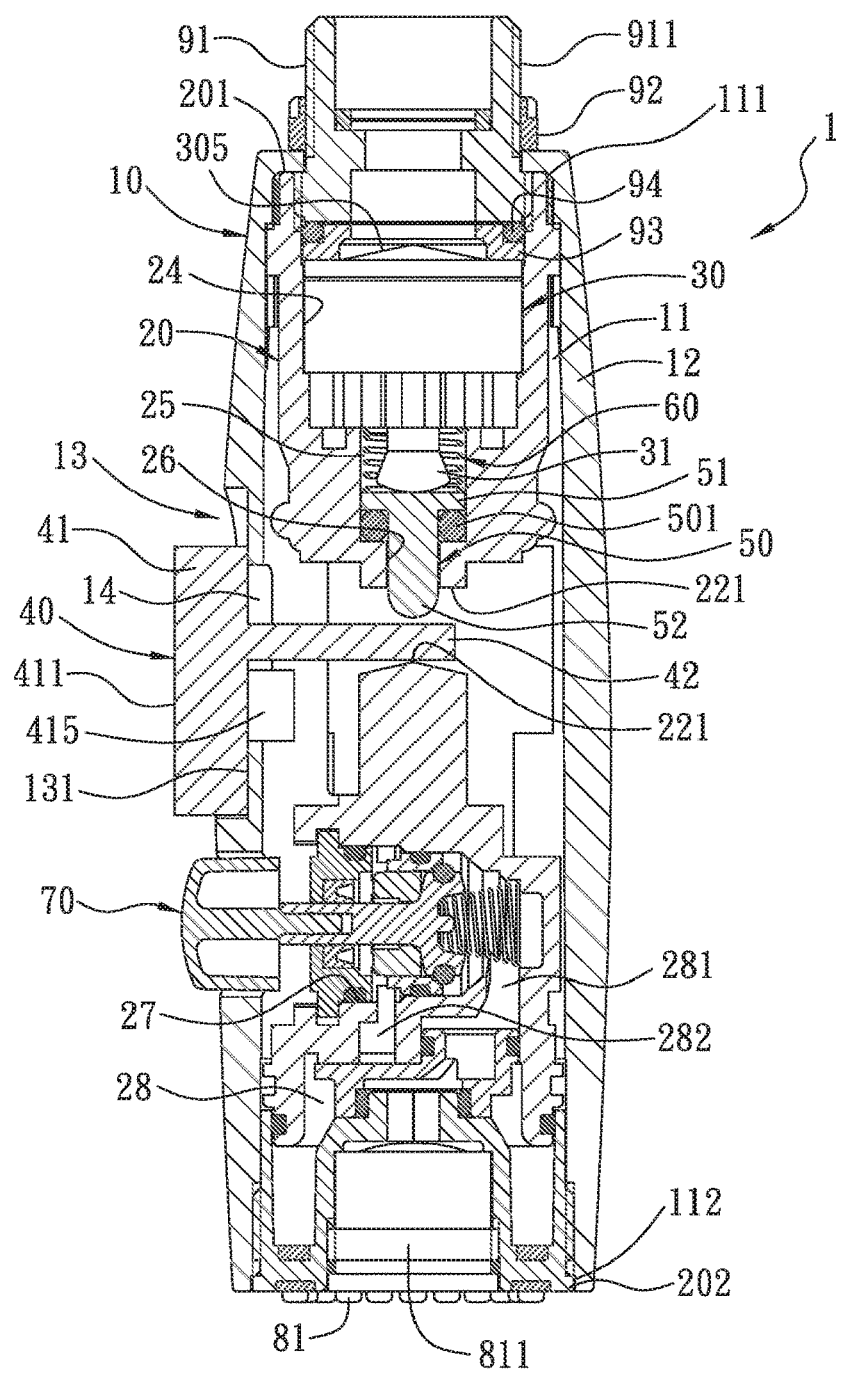
FIG. 3 is a cross-sectional view of an embodiment of a faucet head, taken along line 1-1 of FIG. 2.
Figure 4:
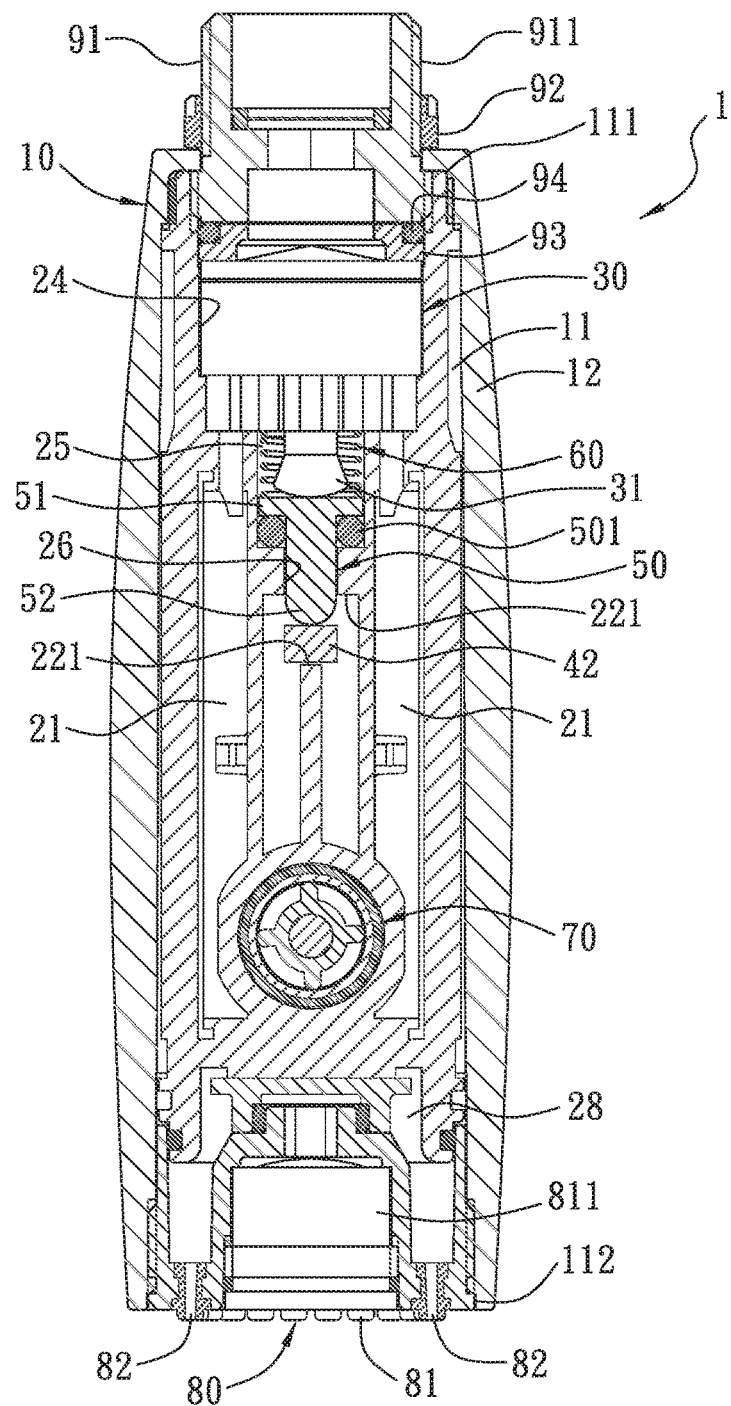
FIG. 4 is a cross-sectional view of an embodiment of a faucet head, taken along line 2-2 of FIG. 2.
Figure 5:
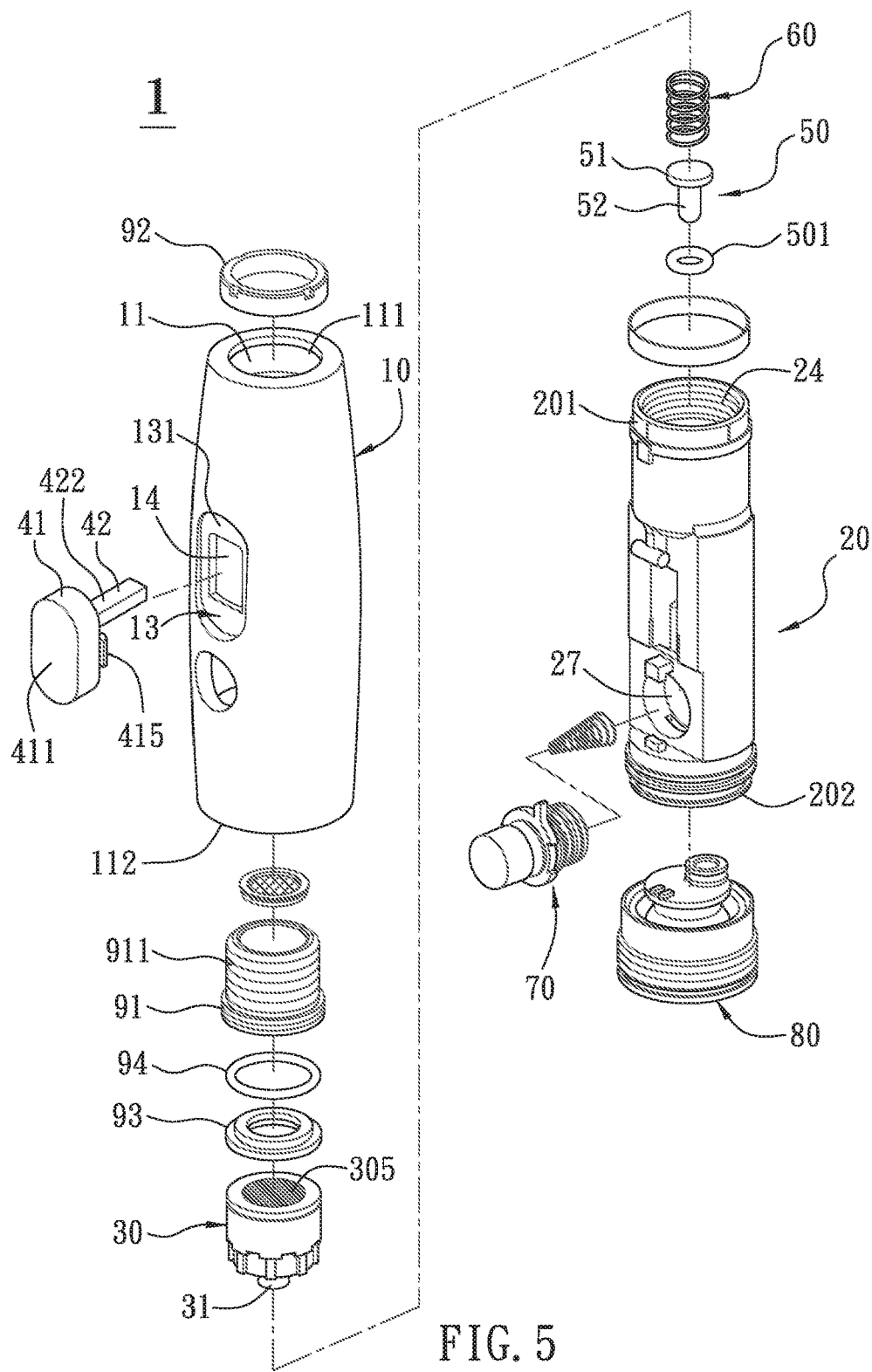
FIG. 5 is an exploded-view diagram illustrating an embodiment of a faucet head consistent with the present invention.

Referring to FIGS. 3-5, faucet head 1 can include an outer casing 10, a chamber 11, a water valve 30, and a sliding member 40. In some embodiments, chamber 11 may be an opening provided within faucet head 1 (or within outer casing 10), and faucet head 1 may provide chamber 11 therein, such as through a uni-body construction or a multiple-part construction. With a uni-body or integrated construction, a substantially-cylindrical space (cylinder) 20 within outer casing 10 may serve as a portion of chamber 11. Outer casing 10 can be manually operated by user, such as for holding and/or pulling faucet head 1, and can include chamber 11. Chamber 11 can be configured to be within faucet head 1 and include a first end 111 and a second end 112. First end 111 of chamber 11 can provide a water inlet coupled with water hose 2, and second end 112 of chamber 11 can provide a water and air outlet to discharge a mixture of water-and-air flow near second end 112 of chamber 11. First end 111 of chamber 11 can be coupled, in a dismountable manner, to second end 402 of faucet base 4.

For example, faucet head 1 can be dismountable from second end 402 of faucet base 4 while remaining coupled to water hose 2 to direct a mixture of water-and-air flow to a location away from faucet base 4 and to be relocated back to second end 402 of faucet base 4 to discharge the mixture of water-and-air flow while being coupled to faucet base 4.

Figure 6:
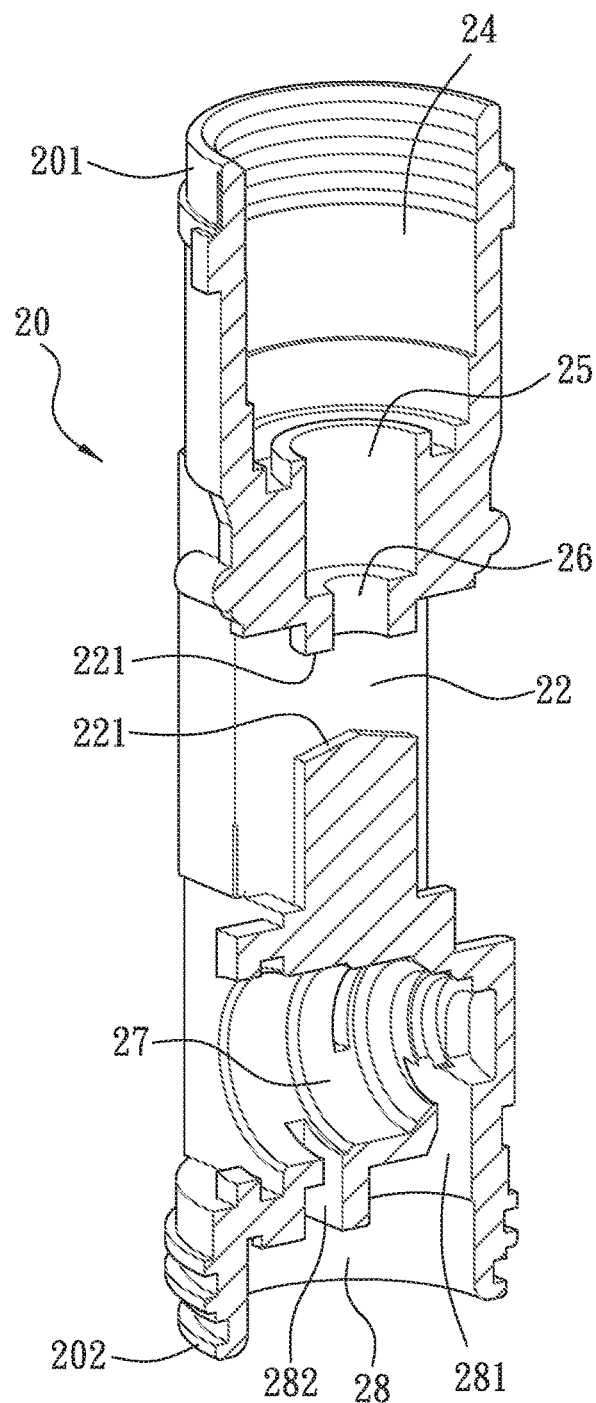
FIG. 6 is a perspective-section diagram illustrating an embodiment of a portion of a chamber in a faucet head consistent with the present invention.
Figure 7:
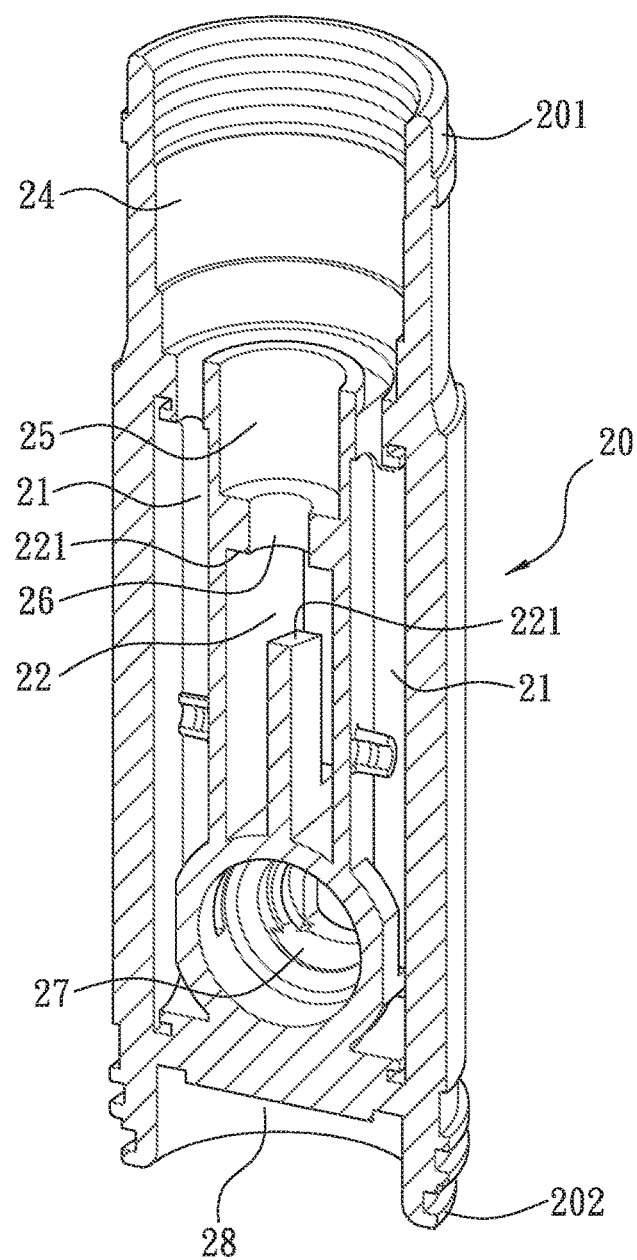
FIG. 7 is another perspective-section diagram illustrating an embodiment of a portion of a chamber in a faucet head consistent with the present invention.

Referring to FIGS. 3-7, cylinder 20 can be housed in chamber 11 of outer casing 10 and can include an inlet segment 201 communicating with water conduit 2b of water hose 2 via an inflow connector 91 (see FIGS. 1 and 2), an outlet segment 202, at least one first orifice 21, and a second orifice 22. As shown in FIGS. 6-7, first orifice 21 and second orifice 22 can be defined between inlet segment 201 and outlet segment 202.

Figure 12:
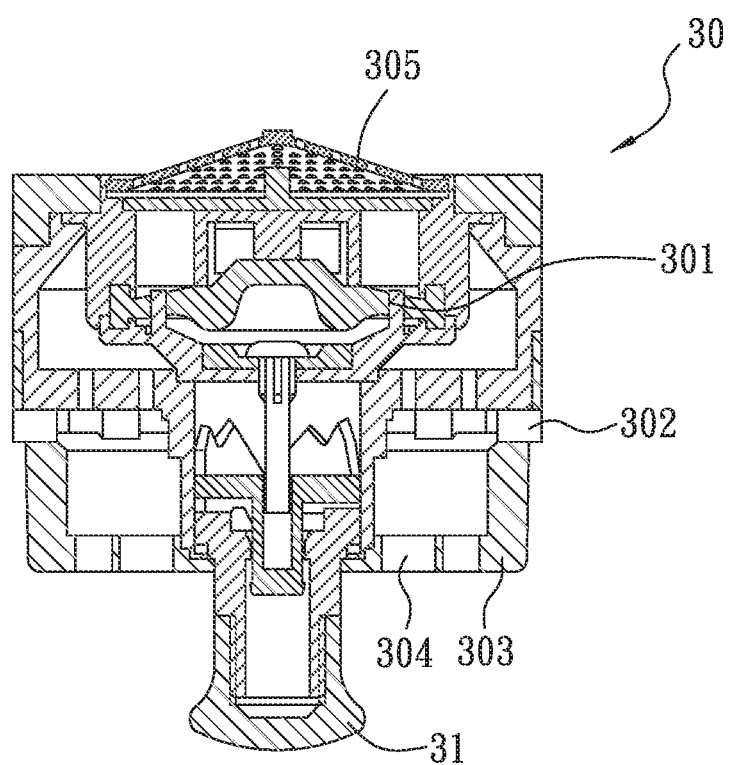
FIG. 12 is a cross-sectional view illustrating an embodiment of a water valve consistent with the present invention.

Water valve 30 can be positioned within chamber 11 and located between first end 111 and second end 112 of chamber 11. Water valve 30 can be accommodated in cylinder 20. Referring to FIG. 12, water valve 30 can include one or more air inlets 302 and a water inlet 305 to enable mixing air from air inlets 302 with water from water inlet 305. Air inlets 302 of water valve 30 can be coupled with chamber 11. Water inlet 305 can be coupled with water hose 2. Chamber 11 can include at least one air inlet near at or near a side of faucet head 1 or second end 112 of chamber 11. The at least one air inlet of chamber 11 can be in communication with air inlets 302 of water valve 30 to enable the water valve's mixing of water and air. For example, an opening on faucet head 1 (or outer case 10) in communication with chamber 11 can serve as the air inlet of chamber 11 to supply air to water valve 30. An opening 13 of outer casing 10, as shown in FIG. 3 and will be described further below, can be adapted to communicate with and allow air intake to air inlets 302 of water valve 30. A side opening of faucet head 1 for accommodating a switch valve 70, as shown in FIG. 3 and will be described further below, can also be adapted to communicate with and allow air intake to air inlets 302 of water valve 30.

Alternatively or additionally, a center outlet 81 and/or a plurality of peripheral outlets 82, as shown in FIG. 3, can serve as an air inlet of chamber 11 to supply air to water valve 30. As will be described further below, center outlet 81 and peripheral outlets 82 can be adapted to communicate with chamber 11 to discharge a flow of the water-and-air mixture in a stream discharge mode and a spray discharge mode, respectively. When in the stream discharge mode, one or more peripheral outlets 82 can be adapted to communicate with and allow air intake to air inlets 302 of water valve 30. When in the spray discharge mode, center outlet 81 can be adapted to communicate with and allow air intake to air inlets 302 of water valve 30.

Water valve 30 can include a control valve 301 movable within water valve 30 between a first position and a second position. The first position can be a position that enables mixing air from air inlets 302 with water from water inlet 305 to provide a mixture of water-and-air flow. The second position can be a position that enables shut-off of a mixture of water-and-air flow. A direction of the movement of control valve 301 between the first position and the second position can be substantially parallel to a direction of a water flow (or a water-and-air flow) from first end 111 to second end 112 of chamber 11. Control valve 301 can be adapted to use a water pressure supplied by water hose 2 to facilitate an operation of control valve 301, either in one direction or in both directions.

Water valve 30 can be a water-pressure-assisted aerator with a control valve. In one embodiment and referring to FIG. 12, water valve 30 can contain a screen 303 coupled with control valve 301 and located downstream of control valve 301. Screen 303 can include a plurality of water passageways 304, with as little as two or four passageways to as many as a dozen or dozens of passageways. Water passageways 304 can be in communication with one or more air inlets 302 of water valve 30 to enable the water valve's mixing of water and air into a mixture of water-and-air flow. Air inlets 302 may have openings from the side, from the above, from the lower portion of water valve 30, or having the openings in any of the combinations. The air inlets may enable the faucet head and the chamber to be designed with flexibilities and with openings or gaps to enable air flow.

Referring to FIGS. 3-5 and 12, control valve 301 can include a driving member 31 that protrudes out from one end of water valve 30, such as from a lower portion or the bottom of water valve 30. Driving member 31 can be engaged with and driven by sliding member 40 to control a position of control valve 301. For example, driving member 31 can be driven to move control valve 301, such as moving it up, to turn on water valve 30 so that water flows into at least one first orifice 21 of cylinder 20 from water conduit 2b of water hose 2 and into water inlet 305 of water valve 30. When control valve 301 is pushed up, it breaks the water-tight seal between control valve 301 and a lateral or internal wall of water valve 30 to cause the water from the connected water hose 2, through water conduit 2b, to flow through water inlet 305. Water inlet 305 may be equipped with a screen, a mesh, or some other debris- or particle-blocking design to avoid any debris or particle from entering the water-tight seal of control valve 301, which may cause it to lead or malfunction. When control valve 301 is lowered, it returns to its water-tight seal state, and the control valve 301 may be designed with surface(s) onto which water pressure may exert additional force to reinforce the water-tight seal between control valve 301 and an internal wall of water valve 30. The seal between control valve 301 and water valve 30 may be formed with rubber, resin, or other suitable sealing materials.

In one embodiment, the control valve may be coupled or equipped with a spring and a cam that moves or locks control valve in two or more different positions each time the driving member 31 is pressed. The design or operation may be similar to or a variation of those used in retractable/clicking pens. U.S. Pat. No. 3,819,282 discloses one example of such design. In one embodiment of control valve 301, a second/resting position can provide a water-tight seal and stop water flow. A first position can open the seal between control valve 301 and internal wall(s) of water 30, and the opening enables the water flow. A third position or additional positions are optional, and when used, it/they may keep the seal open, but modulate the water flow by providing a bigger (or smaller) gap(s) to provide more (or less) water flow than the water flow at the first position.

Driving member 31 can include a pin, rod, stem, tube, or an elongated structure protruding out of water valve 30. Driving member 31 can include a head for coupling with sliding member 40 and a body connected to the head for transmitting force and/or motion.

With reference to FIGS. 3-5, faucet head 1 can include a pin 50 extending out of a cavity 25 from a through hole 26 to engage with sliding member 40 so that sliding member 40 can actuate driving member 31 via pin 50.

As illustrated in FIGS. 3, 8, 9, 10, and 11, sliding member 40 can be movably coupled with faucet head 1 at or near a side of faucet head 1 (or outer casing 10), to enable an operation of control valve 301 within water valve 30. The operation may occur by sliding sliding member 40 in a direction substantially parallel to, but opposite to, for example, the direction of a water flow from first end 111 of chamber 11 to second end 112 of chamber 11. The sliding of sliding member 40 causes control valve 301 to move between the first position and the second position. For example, a movement of sliding member 40 can be in a direction substantially parallel to a direction of the water flow from first end 111 of chamber 11 to second end 112 of chamber 11.

Sliding member 40 can include a first surface 411 and a second surface 422, which is mechanically coupled with first surface 411. First surface 411 can be adapted for user operation, such as to slide sliding member 40 in a direction substantially aligned with a side surface of faucet head 1, such as a side surface of outer casing 40. Second surface 422 can be adapted to engage with control valve 301 to move control valve 301 from the second position to the first position when first surface 411 is slid in a direction substantially opposite to the direction of a water flow from first end 111 of chamber 11 to second end 112 of chamber 11. Second surface 422 can be adapted to engage with control valve 301 to restore control valve 301 from the first position to the second position when first surface 411 is slid again in the direction substantially opposite to the direction of the water flow from first end 111 of chamber 11 to second end 112 of chamber 11.

For example, sliding member 40 can include a sliding portion 41 including first surface 411 and a lever 42 including second surface 422. Lever 42 can be coupled to and extending from sliding portion 41. First surface 411 can be configured to be substantially perpendicular to second surface 422. A part of lever 42 can be limited in second orifice 22 of cylinder 20. First surface 411 can be an external face of sliding member 40. Sliding member can include an internal face 412 coupled with lever 42. First surface 411 can be adapted to allow user operation such as by sliding. First surface 411 can include a contact area, which may have a curved profile, a dimple, or some other surface shape, texture, or pattern so a user can identify it by touching or without looking. Internal face 412 can have a connection portion 414 slidably connected with outer casing 10. Sliding member 40 can be slidably coupled with a side of faucet head 1 to cause a substantially-upward movement of second surface 422 when first surface 411 is operated in a substantially-upward direction. The substantially-upward movement of second surface 422 causes control valve 301 to move from the second position to the first position in a substantially-upward direction. For example, second surface 422 can be caused to contact/push (or exert a force on) driving member 31 or pin 50 to cause driving member 31 to move control valve 301 to the first or second position.

Sliding member 40 can include a button, a plate, a panel, a switch, a knob, a toggle, a stud, a key, or any structure having a surface adapted to enable user operation, such as slide, push, or other movement. Second surface 422 can be adapted to engage with control valve 301. First surface 411 and second surface 422 can be provided through a uni-body construction or a multiple-part construction.

As discussed above, control valve 301 can be configured to remain in the first position after sliding member 40 is slid and released. For example, sliding member 40 can be released after being slid to cause control valve 301 to move to and remain in the first position until sliding member 40 is operated again, such as by sliding, to cause control valve 301 to move from the first position to the second position.

Sliding member 40 can also include a spring to return sliding member 40 to an initial position when sliding member 40 is not being operated. The spring may be part of water valve 30 to provide the spring force to return sliding member 40 to its initial position after a user operate or releases it. The spring may also be a spring separated from a spring of water valve 30 and be placed between sliding member 40 and one part of chamber 11.

Referring to FIGS. 3-7, chamber 11 can include, in cylinder 20, for example, a cavity 24 located in inlet segment 201, cavity 25 formed at a bottom of cavity 24, and through hole 26 in spatial communication with cavity 25. At least one first orifice 21 can communicate with cavity 24 and the outlet segment 202. Water valve 30 can be housed in cavity 24, and driving member 31 can be accommodated in cavity 25.

Figure 10:
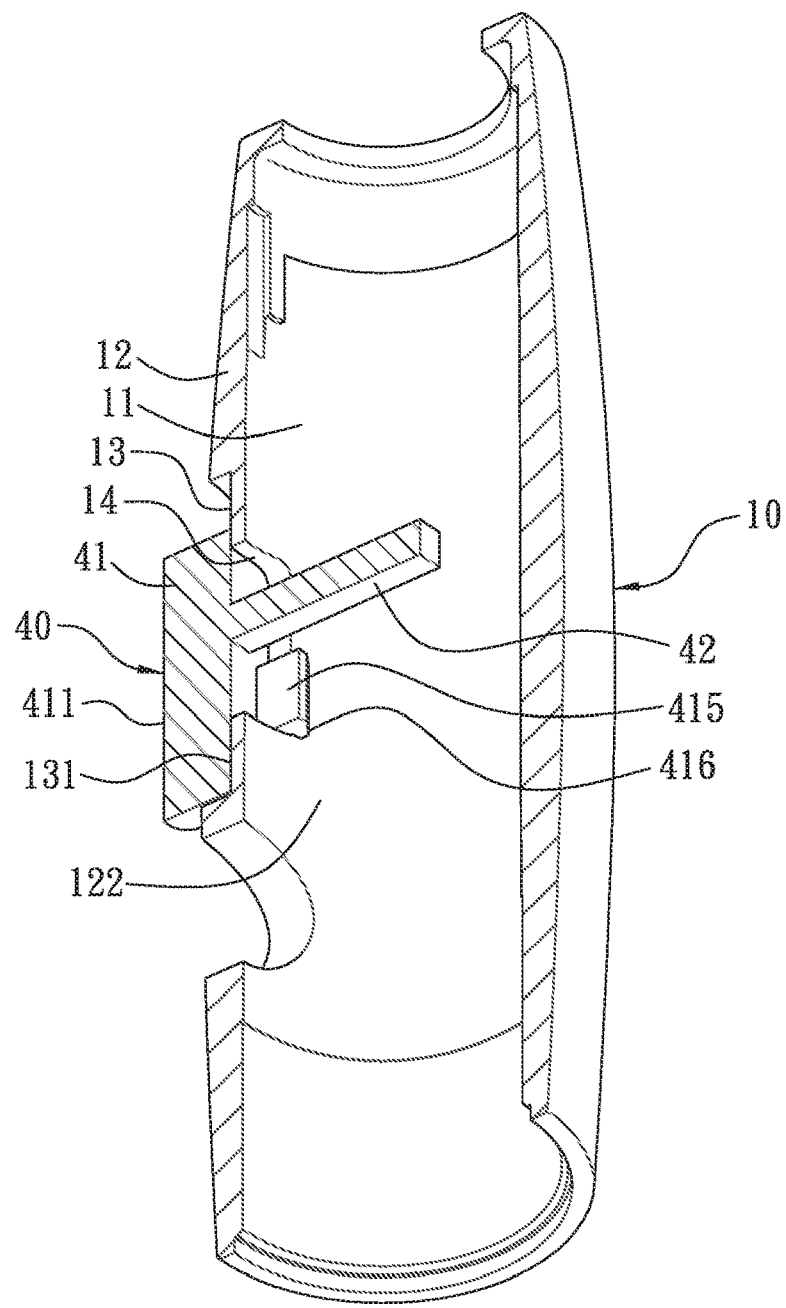
FIG. 10 is another perspective-section view illustrating an embodiment of engagement of a sliding member with a faucet head consistent with the present invention.
Figure 11:
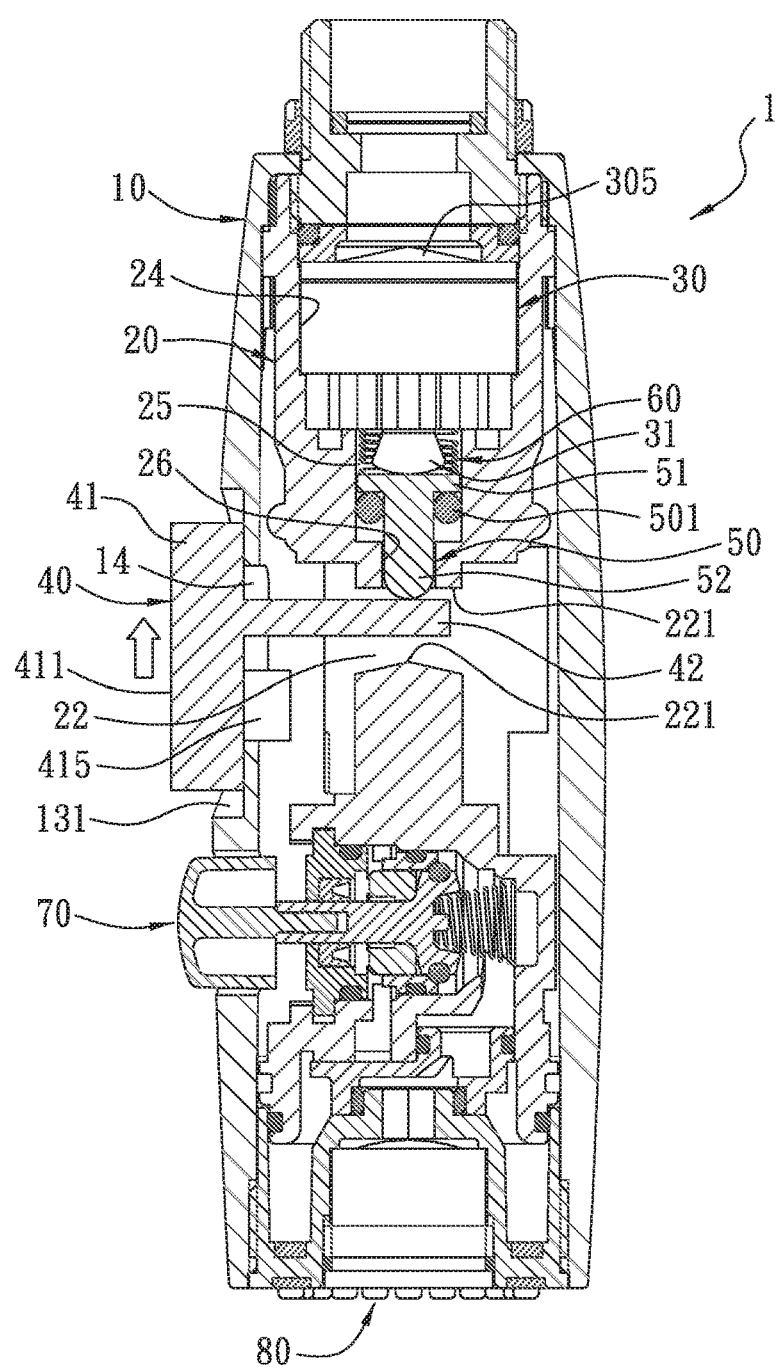
FIG. 11 is a cross-sectional view illustrating an embodiment of a faucet head consistent with the present invention.

Outer casing 10 can include a wall 12 configured to define chamber 11. Outer casing 10 can include an opening 13 defined in wall 12 corresponding to sliding member 40 so that sliding member 40 can be slid in opening 13 when first surface 411 is operated, as shown in FIGS. 3, 10, and 11. Preferably, a size of opening 13 is larger than that of sliding portion 41 of sliding member 40 so that sliding portion 41 can be accommodated in opening 13 while exposing first surface 411. Opening 13 can include a recess 131 to accommodate, in whole or in part, sliding member 40 such that sliding member 40 can be operated in recess 131.

Figure 8:
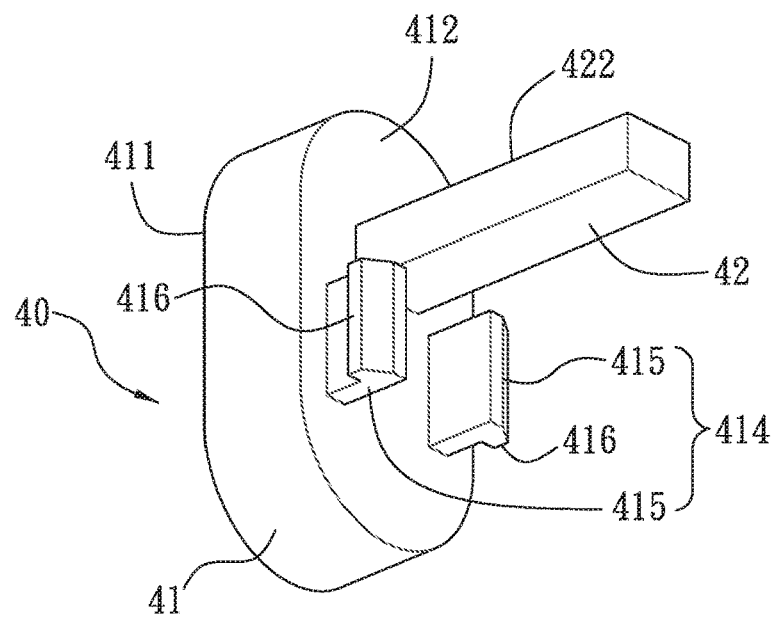
FIG. 8 is a perspective view illustrating an embodiment of a sliding member consistent with the present invention.
Figure 9:
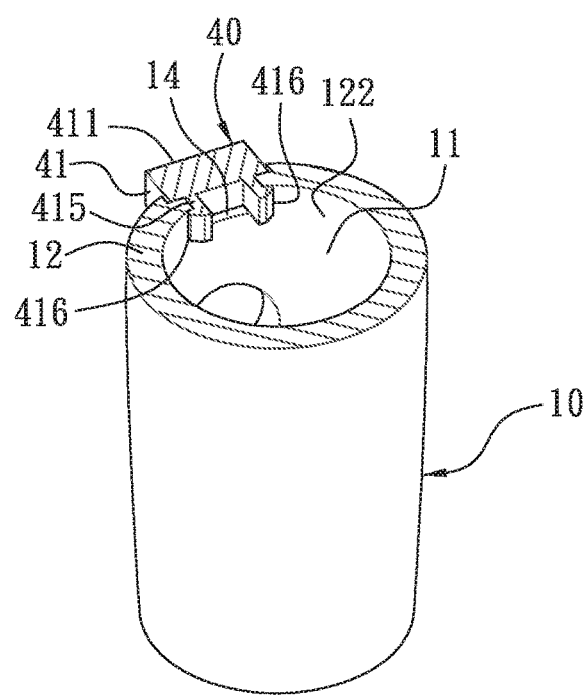
FIG. 9 is a perspective-section view illustrating an embodiment of engagement of a sliding member with a faucet head consistent with the present invention.

Referring to FIG. 8, connection portion 414 can include two hooks 415 extending from internal face 412 of sliding member 40. Hooks 415 can be spaced part on internal face 412. As shown in FIGS. 3, 5, and 9-11, hooks 415 can be adapted to engage with wall 12 of outer casing 10 through an opening 14 of outer casing 10. Hooks 415 can engage with, such as by contacting, one or more edges defining opening 14. Hooks 415 can include one or more barbs 416 for engaging with, such as by contacting, an inner surface 122 of outer casing 10. Hooks 415 can be resilient for insertion of connection portion 414 into opening 14 and adapted to prevent dislocation of sliding member 40 from outer casing 10 while allowing operation of sliding member 40.

Opening 14 can be adapted to limit a movement of sliding member 40 by restricting the movement of hooks 415. Opening 14 can be adapted to have a sufficient size allowing sliding movement of hooks 415 in a direction substantially parallel to the direction of the water flow from first end 111 of chamber 11 to second end 112 of chamber 11. For example, a movement of hooks 415 can be in a direction substantially parallel to a direction of the water flow from first end 111 of chamber 11 to second end 112 of chamber 11. Opening 14 can be nested in opening 13 such that opening 13 allows for movement of sliding portion 41 in opening 13 caused by movement of hooks 415 in opening 14.

In another embodiment, sliding member 40 can include an opening with edges for engaging with hooks of a connection portion disposed at a side of faucet head 1. As discussed above with respect to opening 14 and hooks 415 of connection portion 414, the opening of sliding member 40 and the hooks of the connection portion disposed at the side of faucet head 1 can be similarly configured to engage with each other to enable sliding of sliding member 40 in a direction substantially parallel with the water flow from first end 111 of chamber 11 to second end 112 of chamber 11.

Referring to FIGS. 3-5 and 11, pin 50 can include a head 51 for sliding upward and downward in cavity 25 and a body 52 extending from head 51 and extending out of through hole 26 from head 51. Head 51 can be configured to contact with and drive driving member 31 of water valve 30. A distal end of the body 52 can be in contact with and driven by lever 42 of sliding member 40.

Referring to FIGS. 3-5 and 11, faucet head 1 can further include a compression spring 60 in cavity 25. Compression spring 60 can be accommodated between water valve 30 and head 51 of pin 50 to push pin 50 and sliding member 40 back to their previous positions after sliding member 40 is released.

An extension of through hole 22 of cylinder 20 can be defined by two opposing limiters 221 formed proximate to through hole 22 so that movement of lever 42 of sliding member 40 can be limited between two limiters 221 after sliding member 40 is pressed or released.

As shown in FIG. 3, when sliding member 40 is not operated, sliding portion 41 can be positioned towards a lower end of opening 13 so that it can be slid upward. When sliding member 40 is slid upward, lever 42 can be moved substantially upward away from the lower limiter 221 to push pin 50 upwardly, as shown in FIG. 11. Thus, driving member 31 of water valve 30 can be driven to turn on water valve 30.

Whether sliding member 40 is operated or released can be shown using an on-off indicator. For example, the indicator can indicate an "on" status by showing a color, such as green, of a surface exposed near a lower end of recess 131 when sliding member 40 is slid upward in opening 13 and an "off" status by showing a different color, such as red, of a surface exposed near an upper end of recess 131 when sliding member 40 is not operated or is released after operation. Alternatively or additionally, the indicator can indicate the "on" and/or "off" status using symbols, illumination, or other means. Moreover, the indicator can be adapted on sliding member 40, such as on first surface 411.

Body 52 of pin 50 has can include a first seal washer 501 fitted thereon and sealing cavity 25 so as to prevent water leakage via through hole 26 from cavity 25, as illustrated in FIGS. 3 and 4.

Chamber 11 can provide a housing near second end 112 of chamber 11 to enclose a switch valve 70 guiding a flow of the water-and-air mixture between a stream discharge and a spray discharge. Switch valve 70 can be operated via a switch movably mounted on a side opening of faucet head 1.

For example, faucet head 1 can include switch valve 70 near second end 112 of chamber 11 to switch a flow of the water-and-air mixture between a stream discharge and a spray discharge. For example, switch valve 70 can be arranged on cylinder 20 and configured to switch a water flow between a stream discharge mode and a spray discharge mode. Faucet head 1 can include a water outlet 80, as shown in FIGS. 3 and 4. Switch valve 70 can be operated, such as by pressing, to cause the water to be guided through a center outlet 81 or a plurality of peripheral outlets 82 of water outlet 80 from the at least one first orifice 21 to produce at least two water discharge modes, such as a stream discharge mode and a spray discharge mode.

With reference to FIGS. 6 and 7, cylinder 20 can include a cavity 27 communicating with the at least one first orifice 21 to accommodate switch valve 70. Cylinder 20 can further include a recess 28 for accommodating water outlet 80. Recess 28 can include a central channel 281 and a peripheral channel 282 communicating with cavity 27.

Second end 112 of chamber 11 can provide a stream discharge of a water-and-air mixture through center outlet 81 of water outlet 80 and a spray discharge of a mixture of water and air through the plurality of peripheral outlets 82 of water outlet 80. Center outlet 81 can be in communication with and discharge water from central channel 281. The plurality of peripheral outlets 82 can be in communication with and discharge water from peripheral channel 282. Center outlet 81 can include a foam generator 811 to produce foamy water.

Cylinder 20 can be adapted to match with a water outlet 80 so as to discharge water from the at least one first orifice 21 in a particular discharge mode. Referring to FIGS. 3-5, faucet head 1 can further include an inflow connector 91 engaged at a top of cavity 24. Inflow connector 91 can include a threaded portion 911 extending from outer casing 10, a nut 92 engaging with threaded portion 911 of inflow connector 91 and locking inflow connector 91 and cylinder 20 to the top of outer casing 10, a padding 93 located between inflow connector 91 and a top of water valve 30 to limit water valve 30 in cavity 24, and a second seal washer 94 fitted on padding 93 and contacting with cavity 24.

When control valve 301 of water valve 30 is configured to operate automatically, driving member 31 can be driven to move control valve 301 to a position enabling water discharge. Thereafter, control valve 301 can move back to an original position to stop discharging water.

When control valve 301 is not configured to be automatic, sliding member 40 can be manually operated by the user to close control valve 301. Sliding member 40 can be operated to drive driving member 31 of water valve 30 to move control valve 301 to a position enabling shut-off of water.

Thus, water valve 30 can be driven by sliding member 40 so as to avoid touching and contaminating water valve 30. Sliding member 40 can be rotatably connected with cylinder 20 to simplify faucet head 1 and reduce fabrication cost.

Water valve 30 can be a pre-assembled assembly with a control valve, such as control valve 301, inside the water valve and with a driving member, such as driving member 31, protruding through one end of the water valve and coupled with the control valve to cause the control valve to move between a first and a second position, such as between the first and second position described above.

Faucet head 1 can be further adapted to discharge water in different discharge modes using means other than switch valve 70.

While the preferred embodiments of the invention have been set forth for the purpose of disclosure, modifications of the disclosed embodiments of the invention as well as other embodiments thereof may occur to skilled in the art. Accordingly, the appended claims are intended to cover all embodiments which do not depart from the spirit and scope of the invention.

What is claimed is:

1. A faucet comprising:
   a faucet base having a first and second end, the faucet base being configured to be mounted to support the faucet near the first end and to regulate water flow through the faucet;
   a water hose coupled with the faucet base by extending through the first end and second end of the faucet base, the water hose being configured to be flexible and movable through an opening in the first end and through an opening in the second end;
   a faucet head movably coupled to the second end of the faucet base, the faucet head being configured to be dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base;
   a chamber within the faucet head having a first end and a second end, the first end of the chamber being coupled with the water hose and being coupled, in a dismountable manner, to the second end of the faucet base, the second end of the chamber providing an outlet to discharge the mixture of water-and-air flow;
   an aerator within the chamber and located between the first end and the second end of the chamber, the aerator comprising:
      at least one air inlet and a water inlet to enable mixing air from the at least one air inlet with water from the water inlet, the water inlet being coupled with the water hose, the air inlet being coupled with the chamber, and
      a control valve movable within the aerator between a first position and a second position, the first position enabling mixing air from the air inlet with water from the water inlet to provide the mixture of water-and-air flow, and the second position enabling shut-off of the mixture of water-and-air flow, a direction of the control valve's movement between the first position and the second position being substantially parallel to a direction of a water flow from the first end of the chamber to the second end of the chamber, the control valve using a water pressure supplied by the water hose to facilitate an operation of the control valve;
   a sliding member movably coupled with the faucet head at a side of the faucet head, the sliding member being configured to enable the operation of the control valve within the aerator by being slid from the side of the faucet head in a direction substantially parallel to the direction of the water flow from the first end of the chamber to the second end of the chamber, the sliding of the sliding member causing the control valve to move between the first position and the second position; and
   a switch valve near the second end of the chamber to switch a flow of the water-and-air mixture between a stream discharge and a spray discharge.

2. The faucet of claim 1, wherein the chamber is an opening provided within the faucet head, and the faucet head provides the chamber therein through one of a uni-body construction or a multiple-part construction.

3. The faucet of claim 1, wherein the sliding member comprises a first surface and a second surface mechanically coupled with the first surface, the first surface being configured for user operation in a direction substantially parallel to a side surface of the faucet head.

4. The faucet of claim 3, wherein the second surface is configured to engage with the control valve to move the control valve from the second position to the first position when the first surface is slid in a direction substantially opposite to the direction of the water flow from the first end of the chamber to the second end of the chamber, the second surface is configured to engage with the control valve to restore the control valve from the first positon to the second position by moving the control valve from the first position to the second position when the first surface is slid again in the direction substantially opposite to the direction of the water flow from the first end of the chamber to the second end of the chamber, and at least one of the sliding member and the control valve is coupled to a spring that returns the sliding member to an initial position when the sliding member is not being operated.

5. The faucet of claim 1, wherein the sliding member is operated to cause the control valve to move from the second position to the first position, and the control valve remains in the first position until the sliding member is further operated to cause the control valve to move from the first position to the second position.

6. The faucet of claim 1, wherein the chamber includes at least one air inlet at or near a side of the faucet head or the second end of the chamber, the at least one air inlet of the chamber is in communication with the at least one air inlet of the aerator to enable the aerator's mixing of water and air.

7. The faucet of claim 1, wherein the aerator contains a screen coupled with the control valve and located downstream of the control valve, the screen having a plurality of water passageways and being in communication with the at least one air inlet of the aerator to enable the aerator's mixing of water and air.

8. The faucet of claim 1, wherein the faucet base further comprises a water flow control coupled with the water hose, a cold water intake, and a hot water intake to vary, when a water flow is enabled, a mix of cold water and hot water going into the water hose.

9. The faucet of claim 1, wherein the chamber includes a cavity between the first end and the second end of the chamber for receiving the aerator, and the aerator is a pre-assembled assembly with the control valve inside the aerator and with a driving member protruding through one end of the aerator and coupled with the control valve to cause the control valve to move between the first and the second position.

10. The faucet of claim 1, wherein the outlet comprises a water outlet, the water outlet comprises a center outlet and a plurality of peripheral outlets, and the second end of the chamber provides a stream discharge of the mixture of water and air through the center outlet of the water outlet and a spray discharge of the mixture of water and air through the plurality of peripheral outlets of the water outlet.

11. A faucet comprising:
a faucet base having a first and second end;
a water hose extending within the faucet base and being movable through the second end of the faucet base;
a faucet head having a first end, a second end, a chamber between the first and second end of the faucet head and coupled with the water hose, and an outlet coupled with the chamber at or near the second end of the faucet head to discharge a mixture of water-and-air flow, the first end of the faucet head being configured to be coupled to the second end of the faucet base while remaining coupled to the water hose and to be dismountable from the second end of the faucet base while remaining coupled to the water hose;
an aerator within the chamber, the aerator comprising:
one or more air inlets and a water inlet to enable mixing air from the one or more air inlets with water from the water inlet, the water inlet coupled with the water hose, the one or more air inlets being coupled with the chamber, and
a control valve movable within the aerator between a first position and a second position, the first position enabling mixing air from the air inlet with water from the water inlet to provide the mixture of water-and-air flow, and the second position enabling shut-off of the mixture of water-and-air flow, the control valve being configured to move between the first position and the second position in a direction substantially parallel to a direction of a water flow from the first end of the faucet head to the second end of the faucet head, the control valve using a water pressure supplied by the water hose to facilitate an operation of the control valve;
a sliding member movably coupled with the faucet head at a side of the faucet head, the sliding member being configured for user operation by sliding in a direction substantially parallel to the direction of the water flow from the first end of the chamber to the second end of the chamber to cause the control valve to move between the first position and the second position; and
a switch valve near the second end of the chamber to switch a flow of the water-and-air mixture between a stream discharge and a spray discharge.

12. The faucet of claim 11, wherein the sliding member comprises a first surface and a second surface mechanically coupled with the first surface, and the sliding member is slidably coupled with a side of the faucet head to enable a movement of the first surface of the sliding member in a direction substantially parallel to the direction of the water flow from the first end of the faucet head to the second end of the faucet head when the first surface of the sliding member is operated to cause a movement of the second surface in a direction that causes the control valve to move from the second position to the first position.

13. The faucet of claim 12, wherein the first surface of the sliding member is substantially perpendicular to the second surface of the sliding member, and the second surface is part of a lever that engages with the control valve to cause the movement of the control valve.

14. The faucet of claim 13, wherein the second surface is configured to engage with the control valve to restore the control valve from the first position to the second position when the first surface is slid again in the direction substantially opposite to the direction of the water flow from the first end of the faucet head to the second end of the faucet head.

15. The faucet of claim 11, wherein the control valve comprises a driving member protruding from the aerator, the driving member being configured to be moved by the sliding member to cause the movement of the control valve.

16. A faucet comprising:
a faucet base having a first end, second end, and a water flow control coupled near the first end for regulating a water flow through the faucet, the first end of the faucet base being configured to be mounted to support the faucet;
a water hose being accommodated between the first end and second end of the faucet base and movable through an opening near the first end and an opening near the second end of the faucet base;
a faucet head coupled to the water hose and, in a dismountable manner, to the second end of the faucet base while remaining coupled to the water hose;
a chamber within the faucet head, the chamber having a first and second end, the first end of the chamber being coupled with the water hose and being coupled, in a dismountable manner, to the second end of the faucet base, the chamber being configured to discharge a mixture of water-and-air flow near the second end of the chamber;
an aerator within the chamber and located between the first and second end of the chamber, the aerator comprising:
an air inlet and a water inlet to enable mixing air from the air inlet with water from the water inlet to provide the mixture of water-and-air flow, the water inlet being coupled with the water hose, the air inlet being coupled with the chamber, and
a control valve movable within the aerator between a first position and a second position in a direction substantially parallel with a direction of a water flow from the first end of the chamber to the second end of the chamber, the first position enabling mixing air from the air inlet with water from the water inlet to provide the mixture of water- and-air flow, the second position enabling shut-off of the mixture of water-and-air flow, and an operation of the control valve being facilitated by a water pressure supplied by the water hose;
a sliding member movably coupled with the faucet head, the sliding member comprising:
a first surface being configured for user operation in a direction substantially parallel to a side surface of the faucet head, and
a second surface mechanically coupled with the first surface, the second surface being configured to engage with the control valve in a way to move the control valve from the second position to the first position when the first surface is operated by sliding; and
a switch valve near the second end of the chamber to switch a flow of the water-and-air mixture between a stream discharge and a spray discharge.

17. A faucet comprising:
a faucet base having a first and second end, the first end supporting the faucet;
a water hose movably coupled to the faucet base by extending through the first end and second end of the faucet base and being movable through an opening in the first end and through an opening in the second end;

a faucet head mounted to the second end of the faucet base, the faucet head being configured to be dismounted from the second end of the faucet base while remaining coupled to the water hose to direct a mixture of water-and-air flow to a location away from the faucet base, the faucet head being configured to be relocated back to the second end the faucet base to discharge the mixture of water-and-air flow while being coupled to the faucet base;

a chamber within the faucet head having a first end and a second end, the first end of the chamber being coupled with the water hose, the second end of the chamber discharging the mixture of water-and-air flow, the chamber enabling a water flow in a direction from the first end of the chamber to the second end of the chamber;

an aerator within the chamber and located between the first end and the second end of the chamber, the aerator being configured to provide the mixture of water-and-air flow, the aerator comprising a control valve movable within the aerator between a first position and a second position, the first position enabling the discharge of the mixture of water-and-air flow from the second end of the chamber, and the second position enabling shut-off of the mixture of water-and-air flow, a direction of the control valve's movement between the first position and the second position being substantially parallel to the direction of the water flow from the first end of the chamber to the second end of the chamber; and a sliding member slidably coupled to a side of the faucet head, the sliding member being configured to slide from the side of the faucet head in a direction substantially parallel to the direction of the water flow from the first end of the chamber to the second end of the chamber, the sliding of the sliding member causing the control valve to move between the first position and the second position; and a switch valve near the second end of the chamber to switch a flow of the water-and-air mixture between a stream discharge and a spray discharge.

18. The faucet of claim 17, wherein the sliding member is configured to slide in a direction substantially opposite to the direction of the water flow from the first end of the chamber to the second end of the chamber to cause the control valve to move from the second position to the first position.

19. A faucet, comprising:

a faucet base;

a faucet head having a first end, a second end, a chamber between the first and second end of the faucet head, the first end of the faucet head being coupled to the faucet base and being dismountable from the faucet base, the second end of the faucet head being configured to discharge a mixture of water-and-air flow and being coupled to a water hose that extends in the faucet base and is movable relative to the faucet base, wherein the first end of the faucet head remains coupled to the water hose while being dismounted from the faucet base;

an aerator provided within the chamber to enable mixing air with water to provide the mixture of water-and-air flow, the aerator comprising a control valve movable within the aerator between a first position and a second position, the first position enabling the mixing of air with water to provide the mixture of water-and-air flow, the second position enabling shut-off of the mixture of water-and-air flow, the control valve being configured to move between the first position and the second position in a direction substantially parallel to a direction of a water flow from the first end of the faucet head to the second end of the faucet head; and a sliding member movably coupled with the faucet head at a side of the faucet head, the sliding member being configured to slide in a direction substantially parallel to the direction of the water flow from the first end of the faucet head to the second end of the faucet head to cause the control valve to move from the second position and the first position to enable the discharge of a mixture of water-and-air flow at the second end of the faucet head; and a switch valve near the second end of the chamber to switch a flow of the water-and-air mixture between a stream discharge and a spray discharge.

* * * * *